(12) United States Patent
DeCesare et al.

(10) Patent No.: US 9,243,723 B2
(45) Date of Patent: Jan. 26, 2016

(54) UNIVERSAL MOUNTING CLAMP

(71) Applicant: Bridgeport Fittings, Inc., Stratford, CT (US)

(72) Inventors: Christopher W. DeCesare, Naugatuck, CT (US); Erik G. Senseney, Highlands Ranch, CO (US)

(73) Assignee: BRIDGEPORT FITTINGS, INC., Stratford, CT (US)

( * ) Notice: Subject to any disclaimer, the term of this patent is extended or adjusted under 35 U.S.C. 154(b) by 0 days.

(21) Appl. No.: 14/178,900

(22) Filed: Feb. 12, 2014

(65) Prior Publication Data

US 2014/0263874 A1    Sep. 18, 2014

Related U.S. Application Data

(60) Provisional application No. 61/783,478, filed on Mar. 14, 2013.

(51) Int. Cl.
    *F16L 3/08*    (2006.01)
    *F16L 3/04*    (2006.01)
    *F16L 3/123*   (2006.01)

(52) U.S. Cl.
    CPC .. *F16L 3/04* (2013.01); *F16L 3/123* (2013.01)

(58) Field of Classification Search
    CPC .................................. F16L 3/04; F16L 3/123
    USPC .............. 248/62, 67.5, 69, 71, 73, 74.1, 74.5; 403/236, 386; 439/811
    See application file for complete search history.

(56) References Cited

U.S. PATENT DOCUMENTS

| | | | |
|---|---|---|---|
| 1,995,370 A * | 3/1935 | Walters | 248/68.1 |
| 2,357,375 A * | 9/1944 | Atkinson | 248/74.5 |
| 2,499,981 A | 3/1950 | Strobel | |
| 2,618,033 A * | 11/1952 | Tinnerman et al. | 248/68.1 |
| 2,884,214 A | 4/1959 | Wrobel | |
| 3,012,746 A * | 12/1961 | Pfaff et al. | 248/74.5 |
| 3,150,539 A * | 9/1964 | Wallis, Jr. | 74/502.4 |
| 3,157,001 A | 11/1964 | Vail | |
| 3,430,905 A * | 3/1969 | Pepe | 248/74.5 |
| 3,559,933 A | 2/1971 | Castellani | |
| 3,562,701 A | 2/1971 | Verespej | |
| 3,951,368 A | 4/1976 | Appleton | |
| 4,825,513 A | 5/1989 | Verespej | |

(Continued)

FOREIGN PATENT DOCUMENTS

| | | | |
|---|---|---|---|
| DE | 946458 C | * | 8/1956 |
| DE | 1142085 B | * | 1/1963 |
| FR | 2909153 A1 | * | 5/2008 |

*Primary Examiner* — Gwendolyn W Baxter
(74) *Attorney, Agent, or Firm* — Ware, Fressola, Maguire & Barber LLP

(57) ABSTRACT

A mounting clamp for securing a conduit to a surface is disclosed. The clamp has a strap and a clampback. The clampback has a conduit support on one end portion and a curved section on another end portion. The strap has a first strap portion facing the conduit support and a second strap portion connected to the curved section to allow the first strap portion to bend toward or away from the conduit support. The first strap portion has at least one curved portion with a first radius of curvature to secure a conduit of a first range of sizes, and another curved portion with a second radius of curvature to secure a conduit of a second range of sizes that is partially different from the first range of sizes. The conduit support portion has two sidewalls spaced from each other, each with a curved segment to receive the conduit.

18 Claims, 8 Drawing Sheets

(56) References Cited

U.S. PATENT DOCUMENTS

| | | | |
|---|---|---|---|
| 5,028,021 A * | 7/1991 | Sugiyama et al. ............ 248/74.5 |
| 5,031,864 A * | 7/1991 | Krol ................................ 248/71 |
| 5,039,181 A | 8/1991 | Lautenschlager |
| 5,054,741 A * | 10/1991 | Ismert ............................ 248/74.5 |
| 5,244,301 A | 9/1993 | Kurke et al. |
| 5,357,654 A | 10/1994 | Hsing-Chi |
| 5,722,718 A | 3/1998 | Still et al. |
| 6,010,045 A | 1/2000 | Rogers et al. |
| 7,055,786 B2 | 6/2006 | Garassino et al. |
| 7,097,666 B2 | 8/2006 | Curtis |
| 7,959,114 B2 | 6/2011 | Spreitzer et al. |
| 8,087,629 B2 | 1/2012 | Gotovac |
| 8,317,526 B2 | 11/2012 | Gardner et al. |
| 8,464,987 B1 * | 6/2013 | DeCesare et al. ............ 248/74.5 |
| 2002/0142674 A1 | 10/2002 | Chadbourne et al. |
| 2008/0149783 A1 | 6/2008 | Michaud |

* cited by examiner

"DETAIL A"

UNIVERSAL MOUNTING CLAMP

CROSS REFERENCE

This application claims benefits to U.S. provisional application No. 61/783,478, filed Mar. 14, 2013, which application is incorporated by reference in its entirety.

TECHNICAL FIELD

The present invention relates to a conduit clamp for mounting a conduit such as an electrical metallic conduit or a flexible metallic conduit to a surface of a structure, and more particularly, to a universal mounting clamp for accommodating different size conduits.

BACKGROUND OF THE INVENTION

There are a number of prior art conduit clamps. Some conduit clamps have a strap sized for a conduit with a particular diameter. In particular, those conduit clamps have a separate strap to be mounted to a clampback.

SUMMARY OF THE INVENTION

The present invention provides a mounting clamp for securing a conduit to an exterior surface. The clamp has a strap and a clampback. The clampback has a conduit support on a first end portion and a curved section on a second end portion. The strap has a first strap portion facing the conduit support and a second strap portion connected to the curved section so as to allow the first strap portion to bend toward or away from the conduit support. The first strap portion has at least a first curved portion with a first radius of curvature to secure a conduit of a first range of sizes, and a second curved portion with a second radius of curvature to secure a conduit of a second range of sizes. The conduit support portion comprises two sidewalls spaced from each other, each with a curved segment to receive the conduit.

Thus one aspect of the invention is a mounting clamp, which comprises:

a strap comprising a first strap portion and a second strap portion; and a clampback comprising a first end portion and a second end portion, the first end portion comprising a conduit support portion, the second end portion comprising a curved section connected to the second strap portion, wherein the first strap portion is configured to cooperate with the conduit support portion so as to secure a conduit, and wherein the first strap portion comprises at least a first curved portion with a first radius of curvature to secure a conduit of a first range of sizes, and a second curved portion with a second radius of curvature to secure a conduit of a second range of sizes that is partially different from the first range of sizes.

In one embodiment of the present invention, the conduit support portion comprises two sidewalls spaced from each other, and each of the two sidewalls comprises a wall curved section, and the wall curved section of each of the two sidewalls comprises a center section having a radius of curvature substantially equal to the first radius of curvature.

In one embodiment of the present invention, the second end portion of the clampback is spaced from the second strap portion having a gap therebetween and wherein at least part of the gap is narrowed when the first strap portion is caused to bend toward the conduit support portion for securing the conduit of the first range of sizes and to bend away from the conduit support portion to release the conduit.

In one embodiment of the present invention, the curved section is flexible for facilitating the bending toward or away the conduit support portion. Furthermore, an opening is formed on the curved section to make the curved section more flexible.

In one embodiment of the present invention, the second strap portion includes a through hole formed therein and the second end portion of the clampback includes a slot formed therein, the slot configured to cooperative with the through hole so as to allow a fastener to secure the mounting clamp to a surface.

In one embodiment of the present invention, the first strap portion comprises a curved surface facing the first end portion of the clampback, the curved surface having a surface length, and wherein the curved surface comprises first and second spaced-apart surface portions along the surface length, the first and second surface portions extending from the curved surface toward the first end portion of the clampback, wherein the first surface portions is configured to define the first curved portion with the first radius of curvature and the second surface portion is configured to define the second curved portion with the second radius of curvature.

The second aspect of the present invention is a method for securing a conduit to a surface with a strap and a clampback, the strap comprising a first strap portion and a second strap portion; and the clampback comprising a first end portion and a second end portion, the first end portion comprising a conduit support portion configured to cooperate with the first strap portion so as to secure the conduit, the method comprises:

connecting a curved section between the second end portion of the clampback to the second strap portion, and providing on the strap portion comprises at least a first curved portion with a first radius of curvature to secure a conduit of a first range of sizes, and a second curved portion with a second radius of curvature to secure a conduit of a second range of sizes that is partially different from the first range of sizes.

In one embodiment of the present invention, a gap is provided between the second end portion of the clampback and the second strap portion, so as to allow at least a part of the gap to narrow when the first strap portion is caused to bend toward the conduit support portion for securing a conduit of the first range of sizes and to widen when the first strap portion is caused to bend away from the conduit support portion to release the conduit. An opening is provided in the curved section for facilitating the bending toward or away the conduit support portion.

BRIEF DESCRIPTION OF THE DRAWINGS

FIGS. 3A-6C are different views of the universal mounting clamp 40 used to secure a conduit 100.

FIGS. 3A, 4A, 5A and 6A are perspective views, FIGS. 3C, 4C, 5C and 6C are top views of the universal mounting clamp.

DETAILED DESCRIPTION OF THE INVENTION

In one embodiment of the present invention, the strap and clampback are constructed as a single-piece. The strap and clampback can be formed from a single piece of sheet metal, such as by stamping and bending. The strap has a plurality of curved portions, each portion having a different curvature to fit the conduits of a certain range of sizes.

Figure 1A:
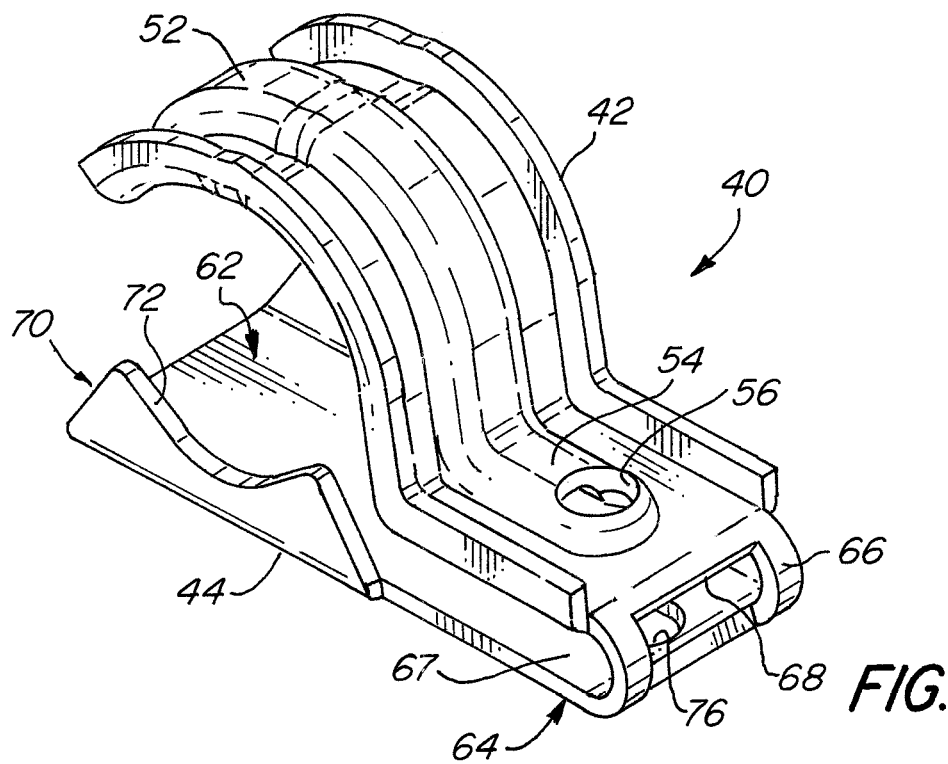
FIGS. 1A and 1B are different perspective views of a universal mounting clamp, according to one embodiment of the present invention.
Figure 1B:
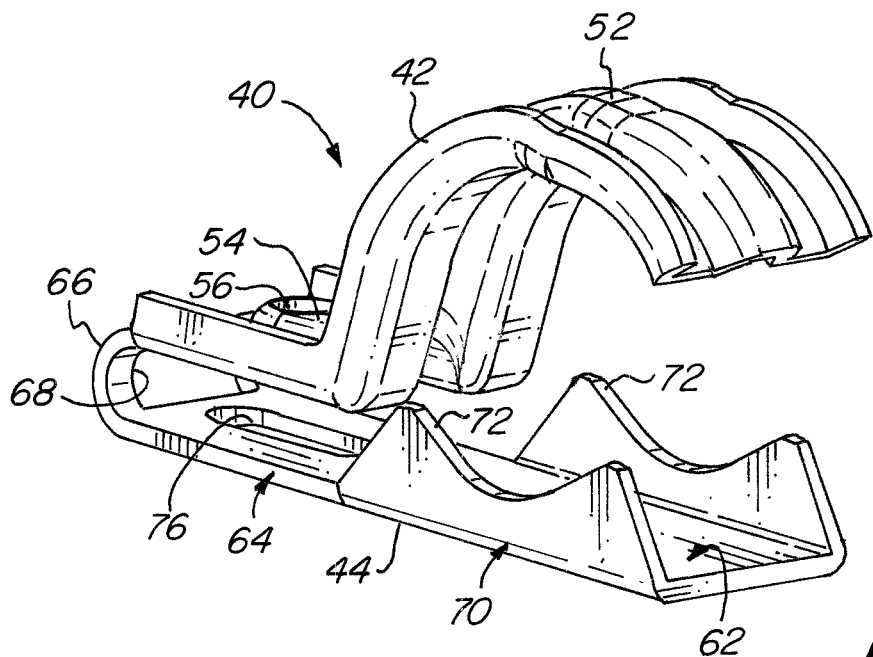

FIGS. 1A and 1B are different perspective views of a universal mounting clamp 40, according to one embodiment of the present invention. As shown in FIGS. 1A and 1B, the universal mounting clamp 40 has a strap 42 and a clampback 44. The strap 42 has a first strap portion 52 and a second strap portion 54. The clampback 44 has a first end portion 62 and a second end portion 64, with the second end portion 64 connected to the second strap portion 54. In this regard, it should be noted that strap 42 and clampback 44 can be formed from one piece of material or can be secured to each other, such as by welding, mechanical interfitment, and other means well-known in the art. The first end portion 62 of the clampback 44 has a conduit support portion 70 dimensioned to support a conduit 100, such as a rigid conduit, an electrical metallic tubing (EMT) and a flexible metallic conduit (FMC) or the like (see FIGS. 3A-6C). The conduit support portion 70 in an embodiment of the invention can be formed by two sidewalls 72 which have a similar configuration. The sidewalls 72 are spaced apart from each other by the width of the first end portion 62 of the clampback 44, for example. The first strap portion 52 is designed to cooperate with the conduit support portion 70 so as to secure the conduit 100. The second end portion 64 of the clampback 44 has a curved section 66 designed to provide a gap 67 between the second end portion 64 of the clampback 44 and the second strap portion 54, so as to allow the first strap portion 52 to move toward the conduit support portion 70 for clamping the conduit 100 when a fastener 90 is tightened into surface 110 (see FIGS. 3A and 3B, for example). As such, the curved section 66, being flexible, functions as a cantilever member or a hinge. The curved section 66 has an opening 68 to facilitate the bending of first strap portion 52 toward or away from the conduit support portion 70. The second strap portion 54 has a through-hole 56 and the second end portion 64 of the clampback 44 has a slot 76 to accommodate the fastener 90.

Figure 2A:
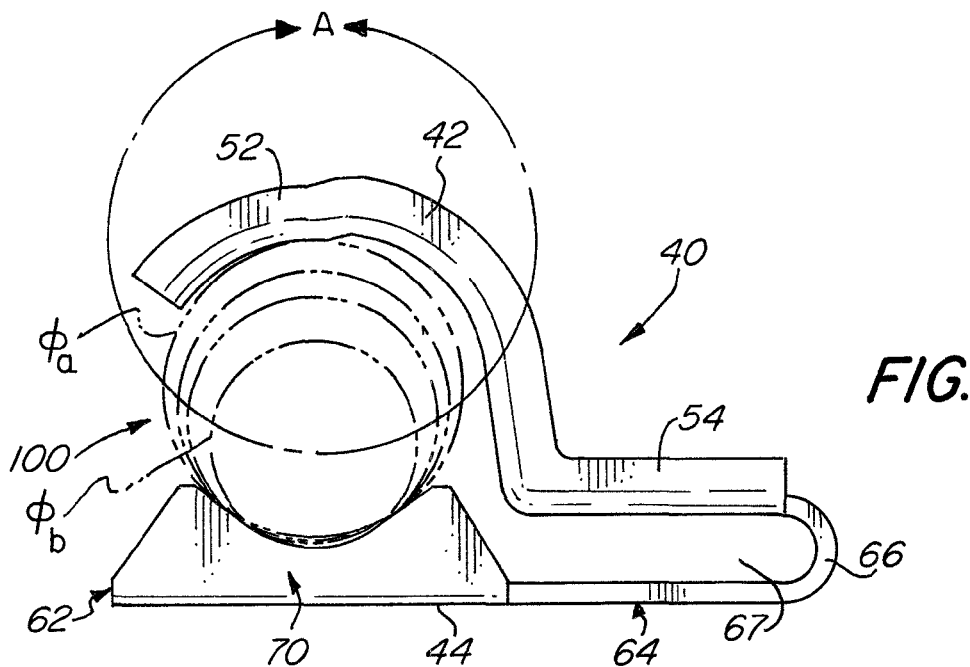
FIGS. 2A-2D are different views of the universal mounting clamp.

FIGS. 2A-2D are different views of the universal mounting clamp 40. FIG. 2A is a side view of the universal mounting clamp 40, showing the strap 42, the clampback 44, the first strap portion 52, the second strap portion 54 of the strap 42, and the first end portion 62, second end portion 64 and curved section 66 of the second end portion 64. FIG. 2A also shows the conduit support portion 70 and the gap 67 between the second end portion 64 of the clampback 44 and the second strap portion 54 of the strap 42. As illustrated in FIG. 2A, the clamp opening between the first strap portion 52 and the conduit support portion 70 is dimensioned for accommodating a conduit 100 of various sizes. For illustration purposes only, the conduit 100 can be of a larger outer-diameter $Ø_a$ or a smaller outer-diameter $Ø_b$, or any sizes in between.

Figure 2B:
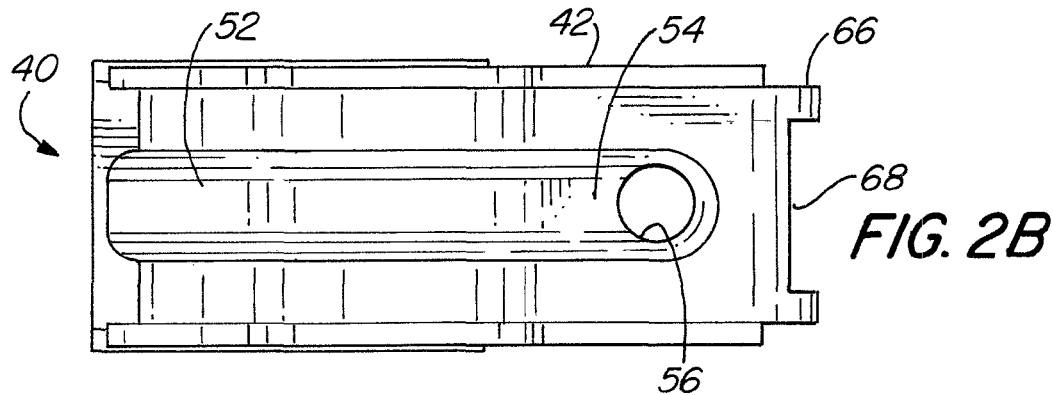

FIG. 2B is a top view of the universal mounting clamp 40, showing the top of the strap 42, including the first strap portion 52, the second strap portion 54 and the through-hole 56. FIG. 2B also shows part of the curved section 66 of the second end portion 64 and the opening 68 in the curved section 66.

Figure 2C:
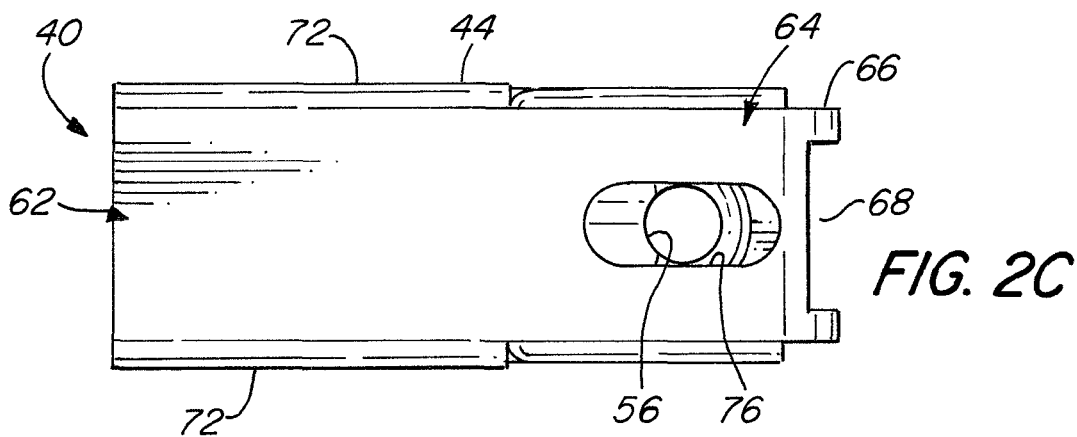

FIG. 2C is a bottom view of the universal mounting clamp 40, showing the clampback 44, including the first end portion 62, the second end portion 64, the curved section 66 of the second end portion 64, and the opening 68 in the curved section 66. FIG. 2C also shows the sidewalls 72 of the conduit support portion 70 (see FIG. 1B) and the slot 76 formed in the second end portion 64 of the clampback 44, in relationship to the through-hole 56. The slot 76 allows shifting of the clampback 44 when a fastener 90 is tightened into an exterior surface 110 for clamping a conduit 100 of a certain outer-diameter.

Figure 2D:
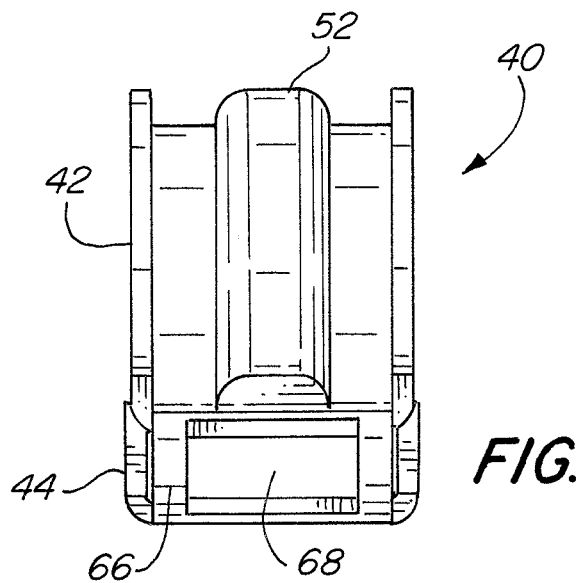

FIG. 2D is a back view of the universal mounting clamp 40, showing the first strap portion 52 of the strap 42, the curved portion 66 of the second end portion 64 and the opening 68 in the curved section 66.

Figure 2E:
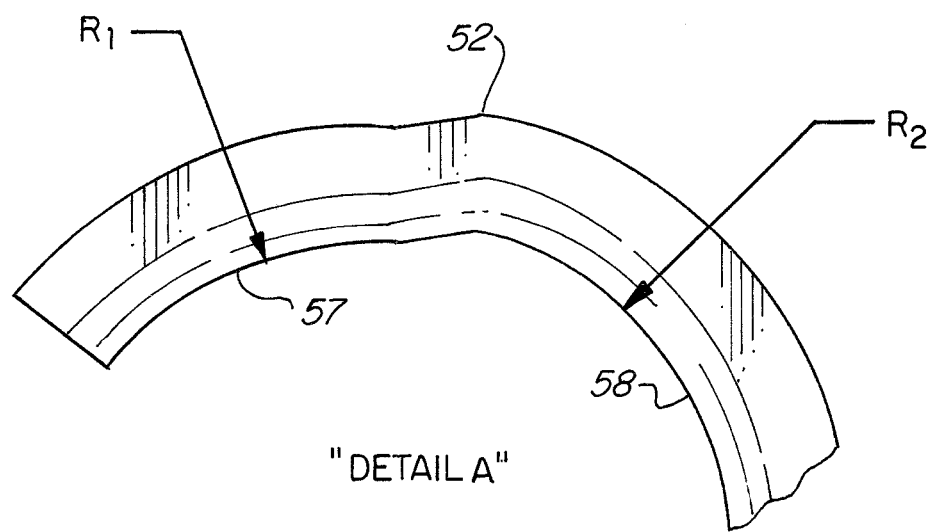
FIG. 2E shows detail A of the first strap portion 52 as indicated in FIG. 2A.

FIG. 2E shows the detail A of the first strap portion 52 as indicated in FIG. 2A. As shown in FIG. 2E, the first strap portion 52 has at least two joining curved portions 57 and 58 with different radii of curvature. The curved portion 57 may have a radius of curvature $R_1$ dimensioned for securing a conduit having a radius (size) within a first range of radii (sizes), whereas the curved portion 58 may have a radius of curvature $R_2$ dimensioned for securing a conduit having a radius (size) within a second range of radii (sizes), wherein the second range of radii are at least partially different from the first range of radii (see FIGS. 3B and 4B, for example).

FIGS. 3A-6C are different views of the universal mounting clamp 40 being used to secure a conduit 100. FIGS. 3A, 4A, 5A and 6A are perspective views and FIGS. 3B, 4B, 5B and 6B are side views of the universal mounting clamp 40, showing the conduit 100 being secured between the first strap section 52 of the strap 42 and the conduit support portion 70 with two sidewalls 72 on the first end portion 62 of the clampback 44 using a fastener 90. FIGS. 3C, 4C, 5C and 6C are top views of the universal mounting clamp 40 being used to secure a conduit 100, showing the first strap portion 52 and the second strap portion 54 of the strap 42, the fastener 90 and part of the curved section 66 of the second end portion 64.

Figure 3A:
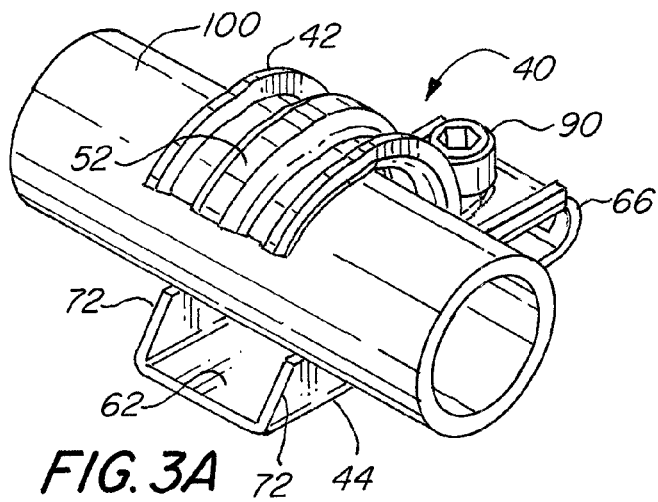
Figure 3C:
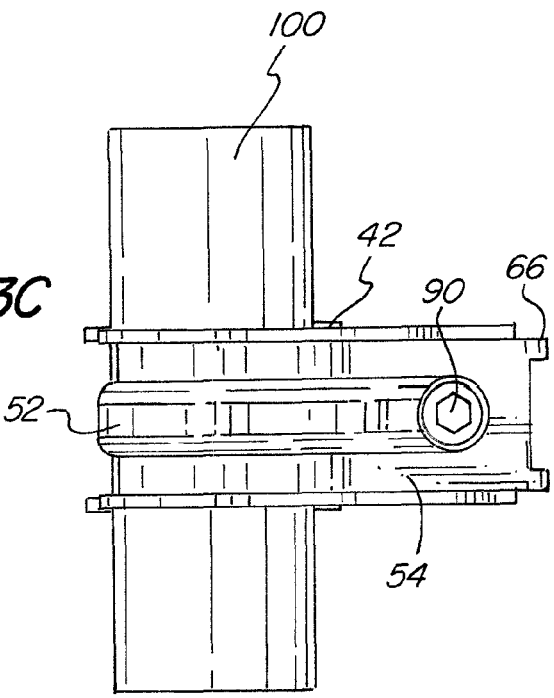
Figure 3B:
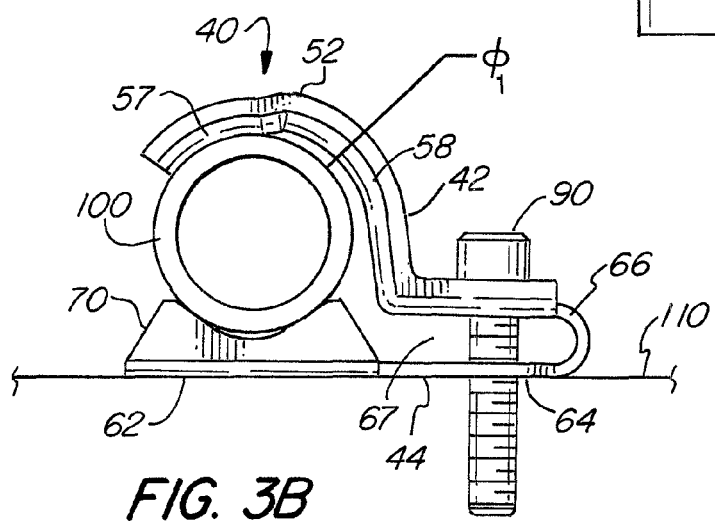
FIGS. 3B, 4B, 5B and 6B are side views.
Figure 4A:
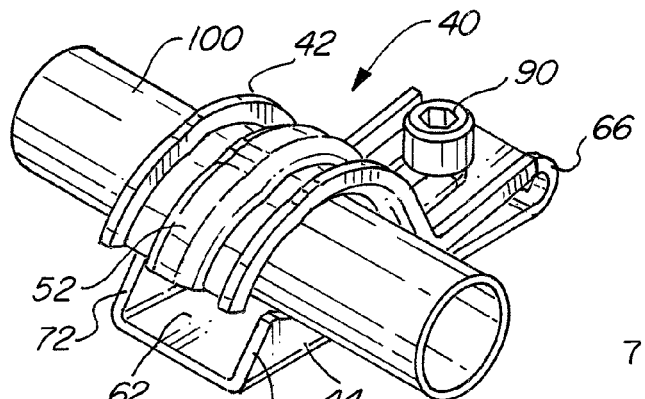
Figure 4C:
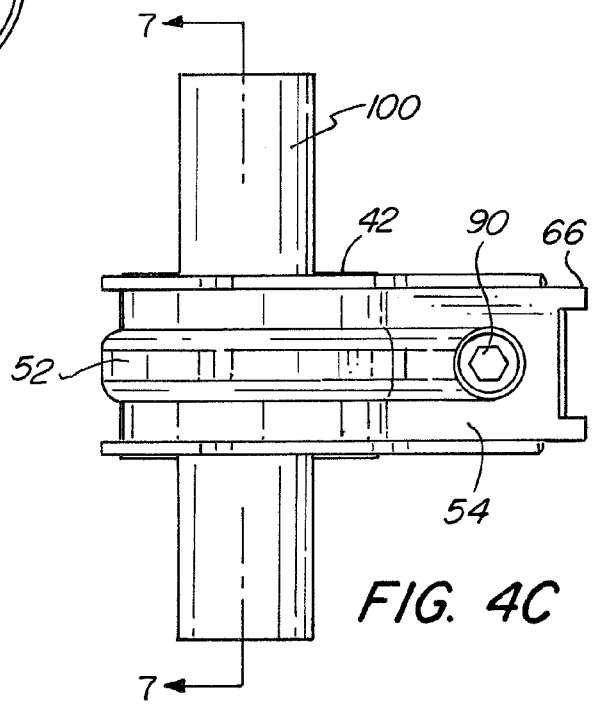
Figure 4B:
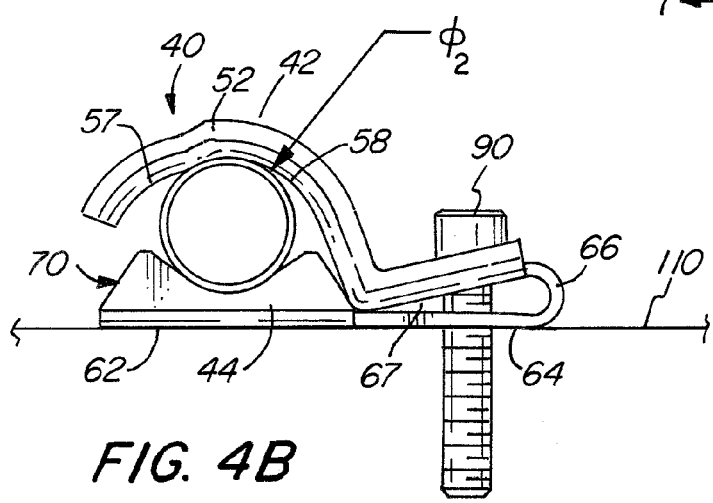
Figure 5A:
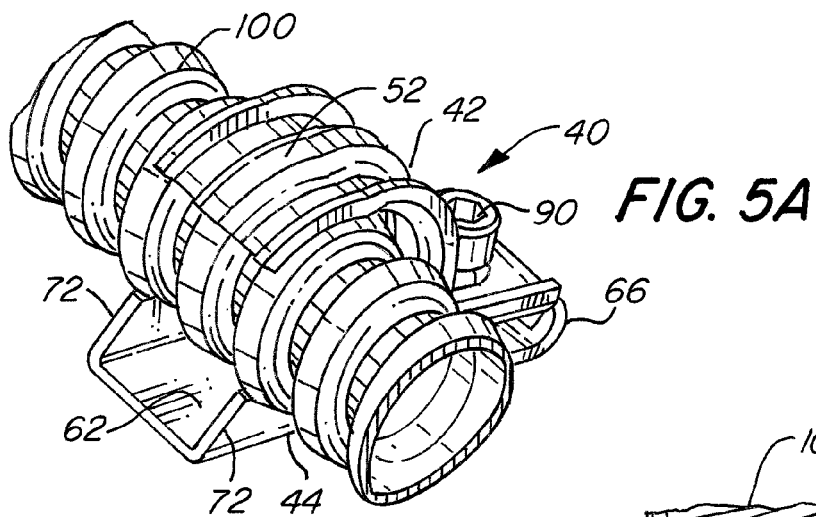
Figure 5C:
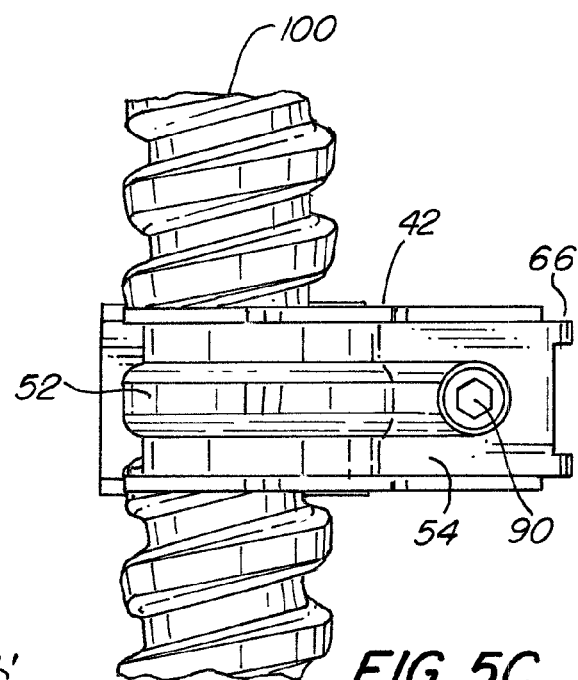
Figure 5B:
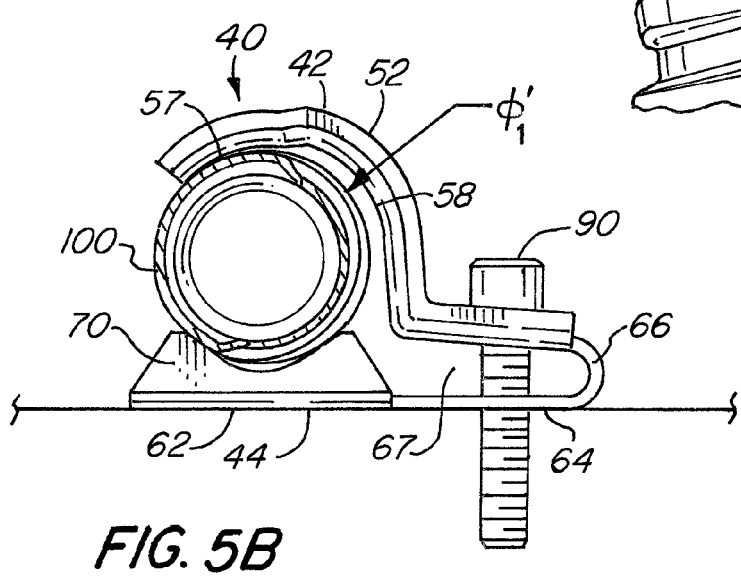
Figure 6A:
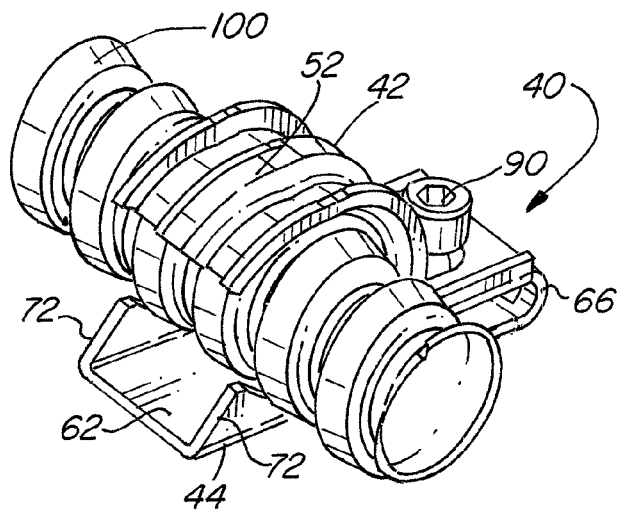
Figure 6C:
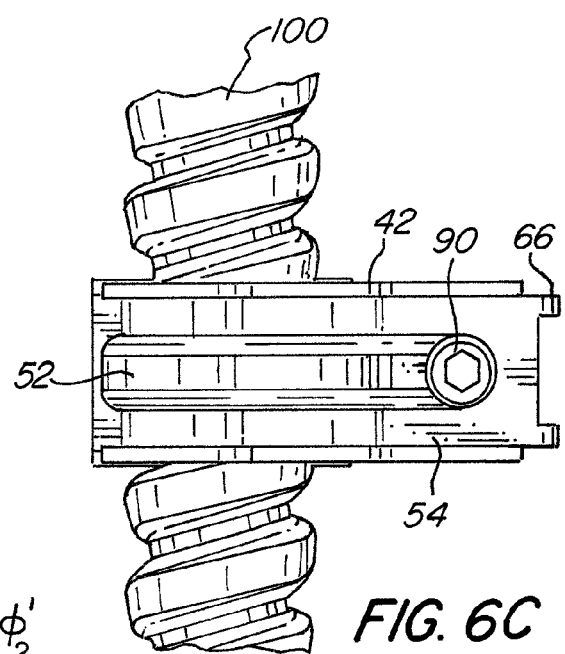
Figure 6B:
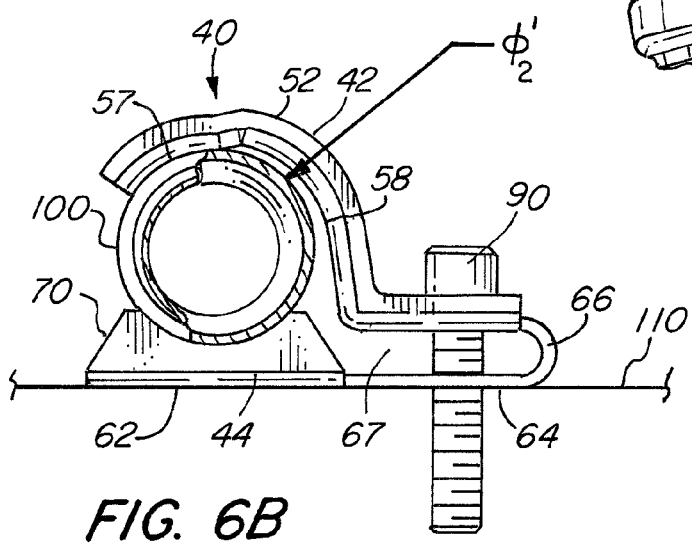

FIGS. 3A-3C illustrate securing a rigid conduit or an electrical metallic tubing (EMT) of a larger diameter. FIGS. 4A-4C illustrate securing a rigid conduit or an electrical metallic tubing of a smaller diameter. FIGS. 5A-5C illustrate securing a flexible metallic conduit (FMC) of a larger diameter. FIGS. 6A-6C illustrate securing a flexible metallic conduit of a smaller diameter.

As shown in FIG. 3B, the conduit 100 has an outer diameter $Ø_1$ substantially equal to two times the radius of curvature $R_1$ of the curved portion 57 (see FIG. 2E). To secure a conduit of such an outer diameter, the first strap portion 52 is moved toward the conduit support portion 70 so that the curved portion 57 of the first strap portion 52 is in firm contact with the conduit 100. With a large conduit 100, the gap 67 is wide. As shown in FIG. 4B, the conduit 100 has an outer diameter $Ø_2$ substantially equal to two times the radius of curvature $R_2$ of the curved portion 58 (see FIG. 2E). To secure a conduit of such a diameter, the first strap portion 52 is moved closer to the conduit support portion 70 so that the curved portion 58 of the first strap portion 52 is in firm contact with the conduit 100. The gap 67 as shown in FIG. 4B is narrower than that shown in FIG. 3B. The curved section 66 allows the gap 67 to vary while the fastener 90 secures the universal mounting clamp 40 to a surface 110. For example, the radius of curvature R1 can be 0.525 inch (13.34 mm) or larger and the radius of curvature R2 can be 0.35 inch (8.89 mm) or smaller. Thus, for each strap portion a range of conduit radii can be accommodated. These range of sizes may overlap to some extent.

Likewise, the curved portion 57 of the first strap portion 52 is used to secure a conduit 100 such as a flexible metallic conduit as shown in FIGS. 5B and 6B.

As shown in FIG. 5B, the flexible metallic conduit 100 has an outer diameter $Ø'_1$ substantially equal to 1.105 inch (28.07 mm). To secure a conduit of such an outer diameter, the first strap portion 52 is moved toward the conduit support portion 70 so that the curved portion 57 of the first strap portion 52 is in firm contact with the conduit 100. With a large conduit, the gap 67 is wide. The gap 67 as shown in FIG. 5B is larger than that shown in FIG. 3B. As shown in FIG. 6B, the flexible metallic conduit 100 has an outer diameter $\varnothing'_2$ substantially equal to 0.84 inch (21.34 mm). To secure a conduit of such a diameter, the first strap portion 52 is moved closer to the conduit support portion 70 so that the curved portion 57 of the first strap portion 52 is in firm contact with the conduit 100. The gap 67 as shown in FIG. 6B is narrower than that shown in FIG. 5B. The curved section 66 allows the gap 67 to vary while the fastener 90 secures the universal mounting clamp 40 to a surface 110.

Figure 7:
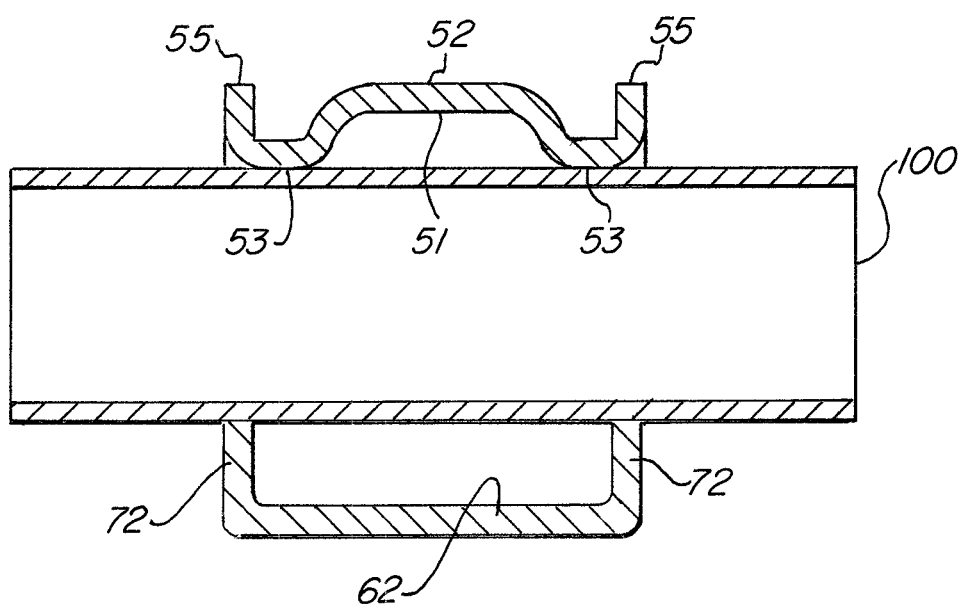
FIG. 7 is a cross-sectional view of the universal mounting clamp 40 used to secure a conduit 100, taken along the line 7-7 as shown in FIG. 4C.

In the embodiment of the present invention as show in FIGS. 1A and 1B, for example, the first strap portion 52 of the strap 42 is not simply a flat sheet shaped into a curved portion. The first strap portion 52 has ridge and valley-like features. As can be seen in FIG. 7, the curved surface 51 facing the first end portion 62 of the clampback 44 has two spaced-apart surface portions 53 along the length of the first strap portion 52, the surface portions 53 extending from the curved surface 51 toward the first end portion 62 of the clampback 44. As such, when the universal mounting clamp is used to secure a conduit 100, only part of the two spaced-apart surface portions 53 are in contact with the conduit 100. These two spaced-apart surface portions 53 define the first curved portion 57 with the first radius of curvature $R_1$ and the second curved portion 58 with the second radius of curvature $R_2$ (see FIG. 2E, for example). Furthermore, strap 42 has two sidewalls 55 extending from the first strap portion 52 to the second strap portion 54. Sidewalls 55 can be seen in FIG. 7, for example. Sidewalls of first strap portion 52 and/or second strap portion 54 give structural rigidity to the overall strap. In one embodiment of the present invention, the entire clamp can be made out of a sheet of metal of the same thickness but stamped and folded into shape. However, the clamp can be shaped or made differently.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A mounting clamp, comprising:
 a strap comprising a first strap portion and a second strap portion; and
 a clampback comprising a first end portion and a second end portion, the first end portion comprising a conduit support portion, the second end portion comprising a flat region joined to the first end portion at one end and joined to a curved section at another end, the curved section fixedly joined to the second strap portion such that the flat region of the second end portion of the clampback is spaced from the second strap portion to form a gap therebetween, wherein the first strap portion is configured to cooperate with the conduit support portion so as to secure a single conduit, wherein the conduit support portion comprises two sidewalls spaced from each other, and wherein each of the two sidewalls of the conduit support portion comprises a wall curved section, and the wall curved section of each of the two sidewalls comprises a center section having a radius of curvature dimensioned to accommodate said single conduit, and wherein the first strap portion comprises at least a first curved portion with a first radius of curvature to secure a conduit of a first range of sizes, and a second curved portion with a second radius of curvature to secure a conduit of a second range of sizes, said second range of sizes at least partially different from said first range of sizes, the first curved portion adjacent to the second curved portion, the first curved portion and the second curved portion configured to cooperate with the sidewalls of the conduit support portion so as to secure said single conduit either of the first range of sizes or of the second range of sizes.

2. The mounting clamp according to claim 1, wherein the second radius of curvature of the second curved portion of the first strap portion is greater than the first radius of curvature of the first curved portion of the first strap portion.

3. The mounting claim according to claim 2, wherein the center section has a radius of curvature substantially equal to the first radius of curvature of the first curved portion of the first strap portion.

4. The mounting clamp according to claim 1, wherein the second strap portion includes a through hole formed therein and the second end portion of the clampback includes a slot formed therein, the slot configured to cooperative with the through hole so as to allow a fastener to secure the mounting clamp to a surface.

5. The mounting clamp according to claim 1, wherein the first strap portion comprises a curved surface facing the first end portion of the clampback, the curved surface having a surface length, and wherein the curved surface comprises first and second spaced-apart surface portions along the surface length, the first and second surface portions extending from the curved surface toward the first end portion of the clampback, wherein the first surface portion is configured to define the first curved portion with the first radius of curvature and the second surface portion is configured to define the second curved portion with the second radius of curvature.

6. The mounting clamp according to claim 1, wherein the first strap portion and the second strap portion have sidewalls so as to facilitate structural rigidity of the strap.

7. The mounting clamp according to claim 1, wherein the strap and clampback are formed from a single piece of material.

8. The mounting clamp according to claim 7, wherein the mounting clamp is formed from metal.

9. A mounting clamp, comprising:
 a strap comprising a first strap portion and a second strap portion; and
 a clampback comprising a first end portion and a second end portion, the first end portion comprising a conduit support portion having a radius curvature dimensioned to secure a single conduit, the second end portion comprising a flat region joined to the first end portion at one end and joined to a curved section at another end, the curved section fixedly joined to the second strap portion such that the flat region of the second end portion of the clampback is spaced from the second strap portion to form a gap therebetween, wherein the first strap portion is configured to cooperate with the conduit support portion so as to secure said single conduit, and wherein the first strap portion comprises at least a first curved portion with a first radius of curvature to secure a conduit of a first range of sizes, and a second curved portion with a second radius of curvature to secure a conduit of a second range of sizes, said second range of sizes at least partially different from said first range of sizes, the first curved portion adjacent to the second curved portion, the first curved portion and the second curved portion configured to cooperate with the conduit support portion so as to secure said single conduit, wherein the gap is dimensioned such that at least part of the gap is narrowed when the first strap portion is caused to bend toward the conduit support portion for securing said single conduit of the first range of sizes and to bend away from the conduit support portion for releasing said single conduit of the first range of sizes.

10. The mounting clamp according to claim 9, wherein the curved section is flexible for facilitating said bending toward or away from the conduit support portion.

11. The mounting clamp according to claim 10, wherein the curved section includes an opening formed therein to make the curved section more flexible than without said opening.

12. A method for securing a conduit to a surface with a strap and a clampback, the strap comprising a first strap portion and a second strap portion; and the clampback comprising a first end portion and a second end portion, the first end portion comprising a conduit support portion configured to cooperate with the first strap portion so as to secure the conduit, said method comprising:

fixedly joining a curved section of the second end portion of the clampback to the second strap portion to form a gap between the second end portion and the second strap portion, and providing on the first strap portion at least a first curved portion with a first radius of curvature to secure a conduit of a first range of sizes, and a second curved portion with a second radius of curvature to secure a conduit of a second range of sizes, said second range of sizes at least partially different from said first range of sizes, the first curved portion adjacent to the second curved portion, the first curved portion and the second curved portion configured to cooperate with the conduit support portion so as to secure a single conduit, wherein the conduit support portion comprises two sidewalls spaced from each other, and wherein each of the two sidewalls of the conduit support portion comprises a wall curved section, and the wall curved section of each of the two sidewalls comprises a center section having a radius of curvature dimensioned to accommodate said single conduit, and wherein the first strap portion comprises at least a first curved portion with a first radius of curvature to secure the conduit of the first range of sizes and the second curved portion with the second radius of curvature to secure the conduit of the second range of sizes, said second range of sizes at least partially different from said first range of sizes, the first curved portion adjacent to the second curved portion, the first curved portion and the second curved portion configured to cooperate with the sidewalls of the conduit support portion so as to secure said single conduit either of the first range of sizes or of the second range of sizes.

13. The method according to claim 12, further comprising placing the conduit having a length between the first strap portion and the conduit support portion of the first end portion of the clampback, so as to allow the conduit support portion to secure said single conduit at two positions along the length of the conduit.

14. The method according to claim 13, wherein the second radius of curvature of the second curved portion of the first strap portion is greater than the first radius of curvature of the first curved portion of the first strap portion, and wherein each of the two sidewalls comprises the wall curved section for securing the conduit in the wall curved section.

15. The method according to claim 14, wherein the center section has a radius of curvature substantially equal to the first radius of curvature of the first curved portion of the first strap portion.

16. The method according to claim 12, further comprising providing a gap between the second end portion of the clampback and the second strap portion, so as to allow at least a part of the gap to narrow when the first strap portion is caused to bend toward the conduit support portion for securing said single conduit of the first range of sizes and to widen when the first strap portion is caused to bend away from the conduit support portion for securing a single conduit of the second range of sizes.

17. The method according to claim 16, further comprising: providing an opening in the curved section for facilitating said bending toward or away the conduit support portion.

18. The method according to claim 12, further comprising: providing a through hole on the second strap portion, and a slot on the second end portion of the clampback, the slot configured to cooperative with the through hole so as to allow a fastener to secure the mounting clamp to the surface.

* * * * *